United States Patent
Luo et al.

(10) Patent No.: US 12,487,720 B2
(45) Date of Patent: Dec. 2, 2025

(54) TOUCH SUBSTRATE, TOUCH DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Hui Luo, Beijing (CN); Jiamian Sun, Beijing (CN); Yuheng Qiu, Beijing (CN); Chaoxue Qin, Beijing (CN); Ying Liu, Beijing (CN); Zerong Yang, Beijing (CN); Yunpeng Zhu, Beijing (CN); Zhiqiang Liang, Beijing (CN); Zhiwei Dang, Beijing (CN); Xuwu Hu, Beijing (CN); Yangsheng Liu, Beijing (CN); Wei Lin, Beijing (CN); Hwang Kim, Beijing (CN); Wanli Bian, Beijing (CN); Jianqiang Zhu, Beijing (CN); Xianglong Chen, Beijing (CN)

(73) Assignees: CHENGDU BOE OPTOELECTRONICS TECHNOLOGY CO., LTD., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/292,466

(22) PCT Filed: Feb. 27, 2023

(86) PCT No.: PCT/CN2023/078511
§ 371 (c)(1),
(2) Date: Jan. 26, 2024

(87) PCT Pub. No.: WO2023/169242
PCT Pub. Date: Sep. 14, 2023

(65) Prior Publication Data
US 2024/0256095 A1    Aug. 1, 2024

(30) Foreign Application Priority Data

Mar. 10, 2022 (CN) .......................... 202210230529.7

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0446* (2019.05);
(Continued)

(58) Field of Classification Search
CPC .......... G06F 2203/904111; G06F 2203/04112; G06F 3/0448; G06F 3/0412;
(Continued)

(56) References Cited

U.S. PATENT DOCUMENTS 9,535,543 B2 *   1/2017 Lee .................. G06F 3/0446
10,942,591 B2 *   3/2021 Wang .................. G06F 3/0412
(Continued)

FOREIGN PATENT DOCUMENTS

CN       105630246 A    6/2016
CN       205281443 U    6/2016
(Continued)

*Primary Examiner* — Ricardo Osorio
(74) *Attorney, Agent, or Firm* — Nath, Goldberg & Meyer; Joshua B. Goldberg

(57) ABSTRACT

The present disclosure provides a touch substrate, a touch display panel and a display apparatus. A line width of at least a part of a bridging electrode in a spacing region between a sub-electrode of a corresponding first touch electrode and a corresponding second touch electrode in a first direction is greater than a line width of the corresponding second touch electrode, so that a routing length of an edge of the bridging electrode in the spacing region can be increased, or so that a certain gap exists between the sub-electrode and the residual metal at the edge of the bridging electrode, the
(Continued)

sub-electrode is insulated from the residual metal, the short circuit between the first touch electrode where the sub-electrode is located and the second touch electrode due to the metal residue can be avoided, and the touch quality of the touch substrate can be ensured.

20 Claims, 8 Drawing Sheets

(52) U.S. Cl.
CPC .............. *G06F 2203/04111* (2013.01); *G06F 2203/04112* (2013.01)

(58) Field of Classification Search
CPC ......... G06F 3/0446; G06F 2203/04111; G06F 3/0443; G06F 3/041; G06F 3/044; G06F 3/0445; G06F 3/04164
See application file for complete search history.

(56) References Cited

U.S. PATENT DOCUMENTS

| | | | | |
|---|---|---|---|---|
| 11,720,192 B2* | 8/2023 | Wu | ................ | G06F 3/0416 345/173 |
| 2011/0304564 A1* | 12/2011 | Kim | ................ | G06F 3/0445 345/173 |
| 2012/0146942 A1* | 6/2012 | Kamoshida | ......... | G06F 3/0446 345/174 |
| 2013/0270079 A1* | 10/2013 | Xie | ................ | G06F 3/0446 200/305 |
| 2015/0021638 A1* | 1/2015 | Oh | ................ | H10H 29/142 257/91 |
| 2015/0355220 A1* | 12/2015 | Kang | ............... | B81C 1/00269 73/504.12 |
| 2019/0361546 A1* | 11/2019 | Pang | ................ | G02F 1/1333 |
| 2020/0089352 A1* | 3/2020 | Kwon | ............... | G06F 3/0445 |
| 2020/0089359 A1* | 3/2020 | Xu | ................ | G06F 3/0443 |
| 2020/0133435 A1* | 4/2020 | Liu | ................ | G06F 3/0412 |
| 2021/0223916 A1* | 7/2021 | Zheng | ............... | G06F 3/0446 |
| 2021/0240303 A1* | 8/2021 | Blondin | ............. | G06F 3/0446 |
| 2021/0373691 A1* | 12/2021 | Li | ................ | G06F 3/0443 |
| 2022/0075467 A1* | 3/2022 | Wei | ................ | G06F 3/0443 |

FOREIGN PATENT DOCUMENTS

| | | |
|---|---|---|
| CN | 104375692 B | 5/2019 |
| CN | 110231892 A | 9/2019 |
| CN | 109375826 B | 5/2020 |
| CN | 111665986 A | 9/2020 |
| CN | 111949158 A | 11/2020 |
| CN | 108549170 B | 4/2021 |
| CN | 113097264 A | 7/2021 |
| CN | 113238402 A | 8/2021 |
| CN | 114115614 A | 3/2022 |
| JP | 2013246723 A | 12/2013 |
| KR | 20110054722 A * | 5/2011 |

* cited by examiner

TOUCH SUBSTRATE, TOUCH DISPLAY PANEL AND DISPLAY APPARATUS

CROSS-REFERENCE TO RELATED APPLICATIONS

This is a National Phase Application filed under 35 U.S.C. 371 as a national stage of PCT/CN2023/078511, filed Feb. 27, 2023, an application claiming the benefit of Chinese Application No. 202210230529.7, filed Mar. 10, 2022, the content of each of which is hereby incorporated by reference in its entirety.

TECHNICAL FIELD

The present disclosure relates to the field of display technology, and in particular to a touch substrate, a touch display panel and a display apparatus.

BACKGROUND

With the progress of the information age, touch-screen technology has gradually replaced key technology and become the mainstream technology of a mobile terminal and the like. At present, the touch screen has been applied in various fields, and a main product includes a mobile terminal such as a touch mobile phone and a notebook computer, a human-computer display interface in the industrial automation industry, or the like.

In order to realize a touch function of a display apparatus, touch electrodes are usually required to be introduced into the display apparatus, and different kinds of touch electrodes are arranged to be insulated from each other and cross each other, and one kind of touch electrodes are generally electrically connected to each other through bridge electrodes below the touch electrodes. However, in the process of forming a touch metal layer, some metal residues exist due to the process, which may cause short circuit between different kinds of touch electrodes, and the touch function to be disabled.

SUMMARY

An embodiment of the present disclosure provides a touch substrate, including: a base substrate; a first metal layer on the base substrate and including a plurality of bridging electrodes; an insulating layer on a side of the first metal layer away from the base substrate; and a second metal layer on a side of the insulating layer away from the base substrate and including a plurality of first touch electrodes and a plurality of second touch electrodes crossing each other and insulated from each other, the plurality of first touch electrodes extend along a first direction, the plurality of second touch electrodes extend along a second direction, the first touch electrode includes at least two sub-electrodes, and the sub-electrode and the corresponding second touch electrode have a spacing region therebetween in the first direction; the bridging electrode electrically connects the at least two sub-electrodes of the corresponding first touch electrode through vias penetrating through the insulating layer, and a line width of at least a part of the bridging electrode in the spacing region is greater than a line width of the second touch electrode.

In some embodiments, in the touch substrate provided in the embodiments of the present disclosure, the bridging electrode in the corresponding spacing region includes a main body, and at least one first connection portion and at least one second connection portion electrically connected to two opposing sides of the main body.

In some embodiments, in the touch substrate provided in the embodiments of the present disclosure, the first connection portion and the second connection portion corresponding to each other are symmetrically disposed about a center line of the main body along the first direction.

In some embodiments, in the touch substrate provided in the embodiments of the present disclosure, the at least one first connection portion and the at least one second connection portion have a triangle shape, a quadrilateral shape, or a trapezoid shape.

In some embodiments, in the touch substrate provided in the embodiments of the present disclosure, the at least one first connection portion and the at least one second connection portion have the triangle shape, and any side of the triangle is electrically connected to the main body.

In some embodiments, in the touch substrate provided in the embodiments of the present disclosure, the at least one first connection portion and the at least one second connection portion have the triangle shape, and any vertex of the triangle is electrically connected to the main body.

In some embodiments, in the touch substrate provided in the embodiments of the present disclosure, the at least one first connection portion and the at least one second connection portion have the trapezoid shape, and any one of two bottom sides of the trapezoid is electrically connected to the main body.

In some embodiments, in the touch substrate provided in the embodiments of the present disclosure, the main body, the at least one first connection portion, and the at least one second connection portion of each bridging electrode have a one-piece structure.

In some embodiments, in the touch substrate provided in the embodiments of the present disclosure, a line width of each bridging electrode in the corresponding spacing region is constant and is greater than the line width of each second touch electrode.

In some embodiments, in the touch substrate provided in the embodiments of the present disclosure, line widths of all the bridging electrodes are the same and each greater than the line width of each second touch electrode.

In some embodiments, in the touch substrate provided in the embodiments of the present disclosure, a shape of each bridging electrode at the location of the corresponding spacer region is a curve.

In some embodiments, in the touch substrate provided in the embodiments of the present disclosure, a difference between the line width of each bridging electrode and the line width of each second touch electrode is greater than or equal to 0.4 µm.

In some embodiments, in the touch substrate provided in the embodiments of the present disclosure, each sub-electrode includes a first portion and a second portion on two opposing sides of a via and arranged along the first direction, the first portion is close to the corresponding second touch electrode, the second portion is away from the corresponding second touch electrode, an orthographic projection of one end of the first portion close to the second touch electrode on the base substrate is in an orthographic projection of the corresponding bridging electrode on the base substrate, and an orthographic projection of the second portion on the base substrate at least partially covers the orthographic projection of the corresponding bridging electrode on the base substrate.

In some embodiments, in the touch substrate provided in the embodiments of the present disclosure, the sub-electrode and the bridging electrode corresponding to each other have a first region overlapping with each other, and a distance between a side of the first region close to the corresponding second touch electrode and a side of the bridging electrode close to the same second touch electrode is greater than or equal to 0.2 µm.

In some embodiments, in the touch substrate provided in the embodiments of the present disclosure, the plurality of first touch electrodes and the plurality of second touch electrodes both have a mesh structure.

In some embodiments, in the touch substrate provided in the embodiments of the present disclosure, the touch substrate further includes: first pads each provided integrally with the corresponding sub-electrode, and second pads each provided integrally with the corresponding bridging electrode; wherein an orthographic projection of each first pad on the base substrate covers an orthographic projection of the corresponding via on the base substrate, and an orthographic projection of each second pad on the base substrate covers an orthographic projection of the corresponding via on the base substrate, and the orthographic projection of each first pad on the base substrate is in the orthographic projection of the corresponding second pad on the base substrate.

In some embodiments, in the touch substrate provided in the embodiments of the present disclosure, the first pads have a saw-tooth shape, and the second pads have a square shape.

Accordingly, the embodiments of the present disclosure further provide a touch display panel, which includes a display substrate and the touch substrate in any one of the embodiments of the present disclosure, and the touch substrate is located on a side of a light outgoing surface of the display substrate.

In some embodiments, in the touch display panel provided in the embodiments of the present disclosure, the display substrate includes a plurality of sub-pixel units, the plurality of first touch electrodes and the plurality of second touch electrodes have both the mesh structure, mesh lines of the mesh structure are at gaps among the plurality of sub-pixel units, and mesh holes of the mesh structure correspond to the plurality of sub-pixel units.

Accordingly, the embodiments of the present disclosure further provide a display apparatus, which includes the touch display panel in any one of the embodiments of the present disclosure.

According to the touch substrate, the touch display panel and the display apparatus provided by the embodiment of the present disclosure, the line width of at least a part of the bridging electrode in the spacing region between the sub-electrode of the corresponding first touch electrode and the corresponding second touch electrode in the first direction is greater than the line width of the second touch electrode. When the line width of only a part of the bridging electrode in the spacing region is greater than the line width of the second touch electrode, a routing length of an edge of the bridging electrode in the spacing region can be increased, so that the residual metal at the edge of the bridging electrode is discontinuous, and the short circuit between the sub-electrode of the first touch electrode and the second touch electrode can be avoided. When the line width of the whole bridging electrode is greater than the line width of the second touch electrode, an orthographic projection of the sub-electrode on the base substrate is located within an orthographic projection of the bridging electrode on the base substrate. That is, a flat insulating layer is arranged between an edge of the sub-electrode and an edge of the bridging electrode, the second metal layer may be completely etched on the flat insulating layer, so that a certain gap exists between the sub-electrode and the residual metal formed at the edge of the bridging electrode, the sub-electrode is insulated from the residual metal, the short circuit between the first touch electrode where the sub-electrode is located and the second touch electrode due to the metal residue can be avoided, and the touch effect of the touch substrate can be ensured.

BRIEF DESCRIPTION OF DRAWINGS

In order to more clearly illustrate the technical solutions in the embodiments of the present disclosure, the drawings to be used in the description of the embodiments will be briefly described below. It is apparent that the drawings in the description below are only some embodiments of the present disclosure. It is obvious for one of ordinary skill in the art that other drawings may be obtained according to these drawings without any creative effort.

DETAIL DESCRIPTION OF EMBODIMENTS

Figure 1:
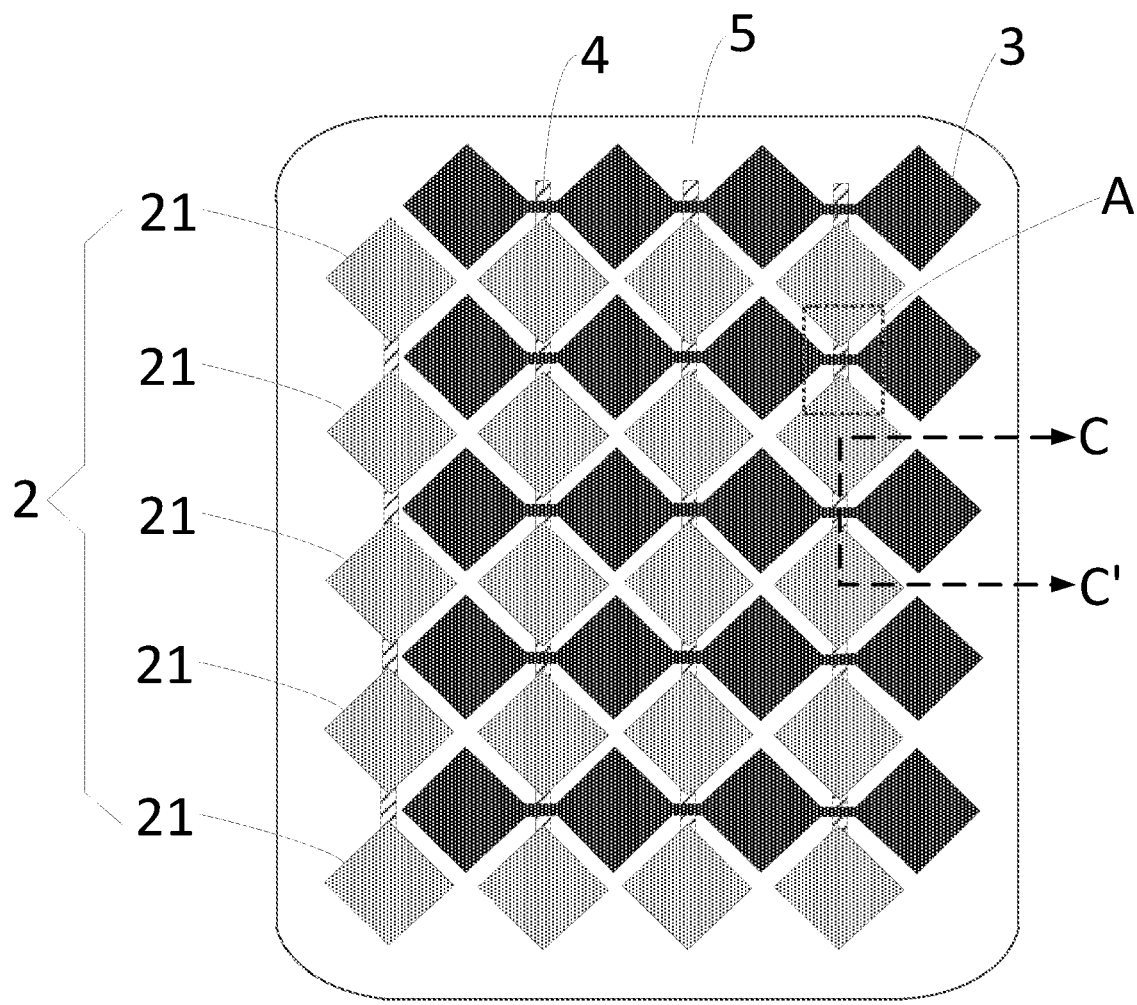
FIG. 1 is a schematic diagram of a structure of a touch substrate in the related art.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that, the described embodiments are only a few, not all of, embodiments of the present disclosure. The embodiments and features of the embodiments in the present disclosure may be combined with each other without conflict. All other embodiments, which can be derived by one of ordinary skill in the art from the embodiments of the present disclosure without any creative effort, are within the protection scope of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections.

It should be noted that, the sizes and shapes of various elements shown in the drawings are not necessarily drawn to scale and are merely schematic representations of the present disclosure. Like or similar reference numerals refer to like or similar elements or elements having like or similar functions throughout.

Figure 2:
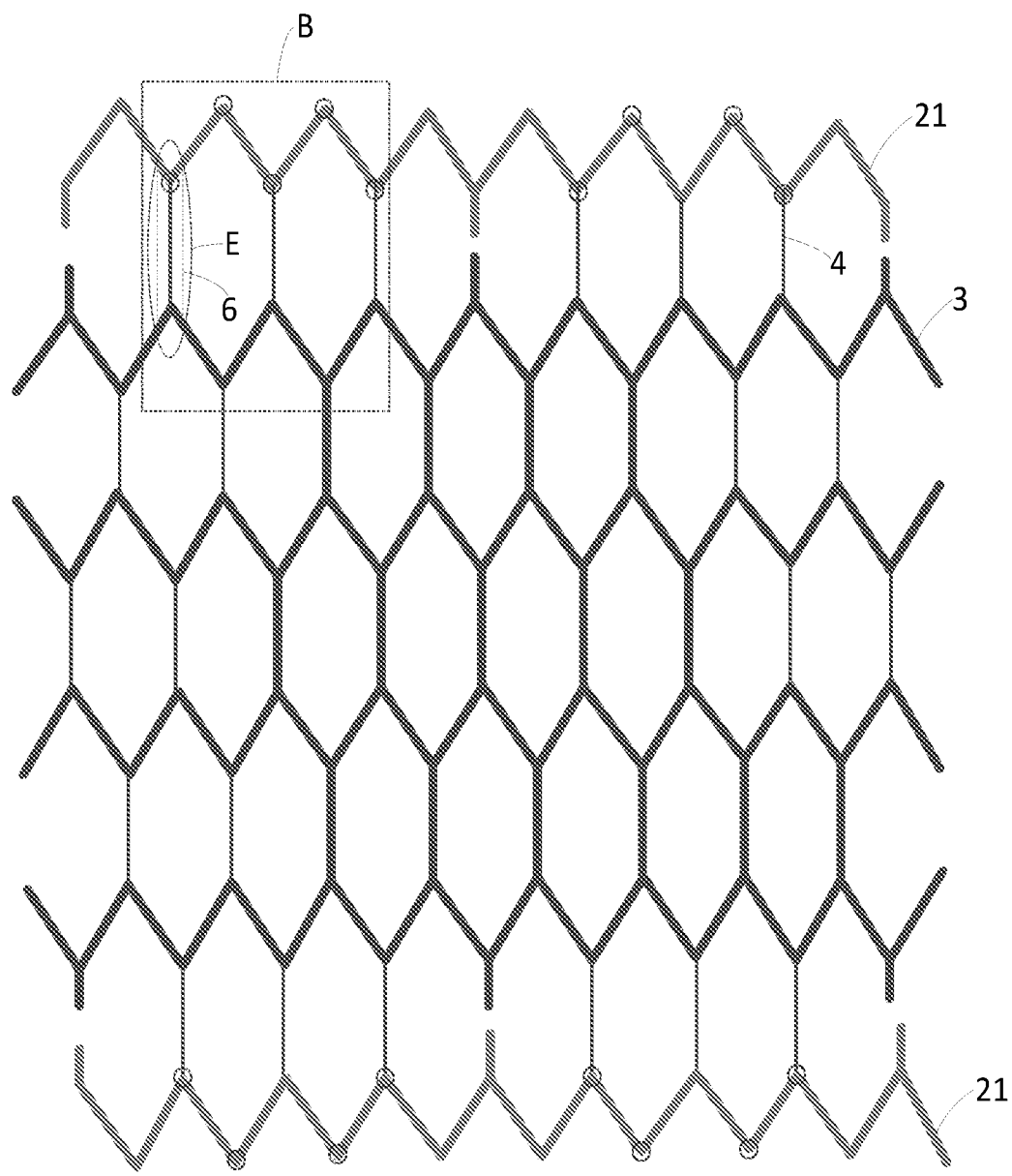
FIG. 2 is an enlarged schematic diagram of a structure in a dashed box A in FIG. 1.
Figure 3:
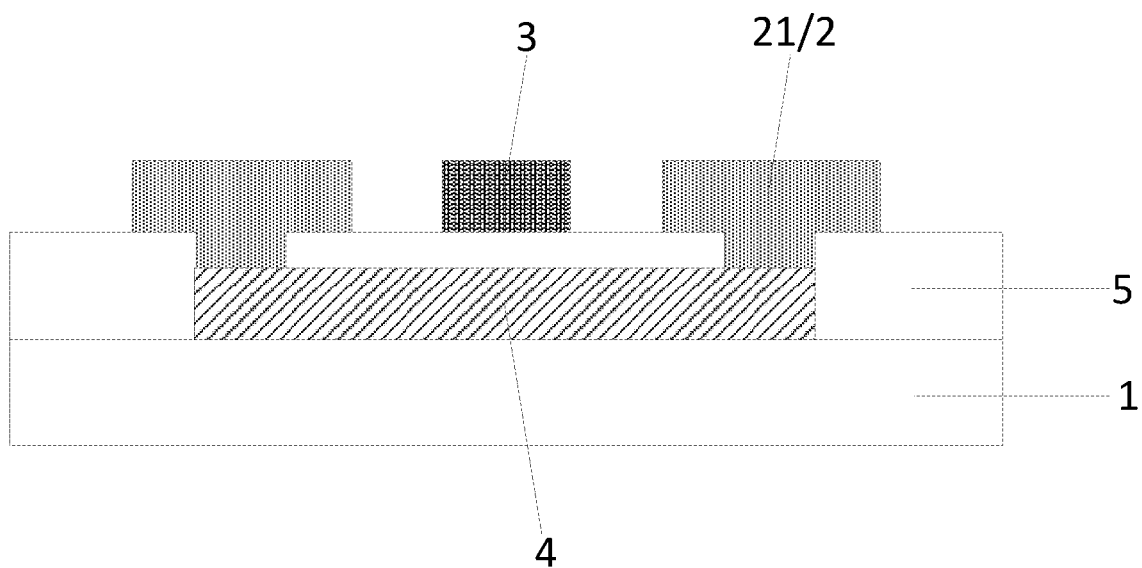
FIG. 3 is a schematic cross-sectional view of a structure taken along a direction CC' of FIG. 1.
Figure 4:
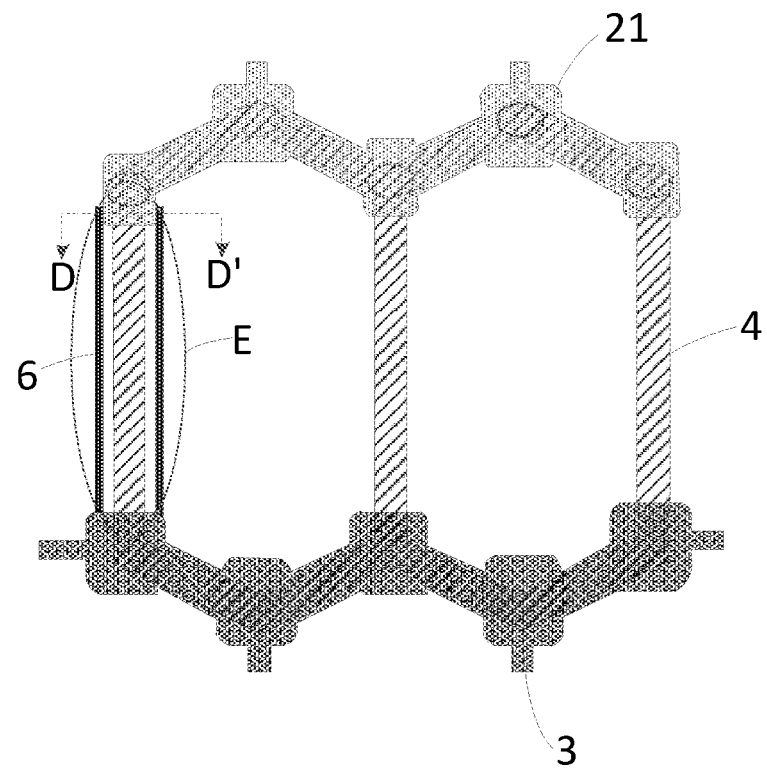
FIG. 4 is an enlarged schematic diagram of a structure in a dashed box B in FIG. 2.

As shown in FIGS. 1 to 4, FIG. 1 is a schematic diagram of a structure of a touch substrate in the related art; FIG. 2 is an enlarged schematic diagram of a structure in a dashed box A in FIG. 1; FIG. 3 is a schematic cross-sectional view of a structure taken along a direction CC' of FIG. 1; FIG. 4 is an enlarged schematic diagram of a structure in a dashed box B in FIG. 2. The touch substrate includes a base substrate 1, a plurality of first touch electrodes 2 and a plurality of second touch electrodes 3 arranged on the base substrate 1 and a plurality of bridging electrodes 4 for electrically connecting the plurality of first touch electrodes 2, the plurality of first touch electrodes 2 cross the plurality of second touch electrodes 3 and are insulated from the plurality of second touch electrodes 3, the plurality of first touch electrodes 2 and the plurality of second touch electrodes 3 are formed in a same metal layer, and the plurality of bridging electrodes 4 are formed in a different metal layer from the plurality of first touch electrodes 2 and the plurality of second touch electrodes 3. Touch information is generated by the touch substrate based on capacitance change between the first touch electrodes 2 and the second touch electrodes 3, thereby achieving a touch function.

As shown in FIG. 3, when the touch substrate is manufactured, a first metal layer is formed on the base substrate 1, and is etched to form the plurality of bridging electrodes 4. An insulating layer 5 is formed on the plurality of bridging electrodes 4, and a second metal layer is formed on the insulating layer 5, and is etched to form the plurality of first touch electrodes 2 and the plurality of second touch electrodes 3. Then, an insulating protection layer may be further formed on the second metal layer for protecting the plurality of first touch electrodes 2 and the plurality of second touch electrodes 3.

As shown in FIG. 2 and FIG. 4, each of a line width of the first touch electrode 2 and a line width of the second touch electrode 3 is generally greater than that of the bridging electrode 4. It should be noted that, a part of the bridging electrodes 4 are correspondingly disposed below the second touch electrodes 3 in FIG. 2, except for another part of the bridging electrodes 4 represented by the reference number 4, and a width of a mesh line of each second touch electrode 3 is greater than a width of the bridging electrode 4 below the second touch electrode 3, so that this part of the bridging electrodes 4 are covered by the second touch electrodes 3.

Figure 5:
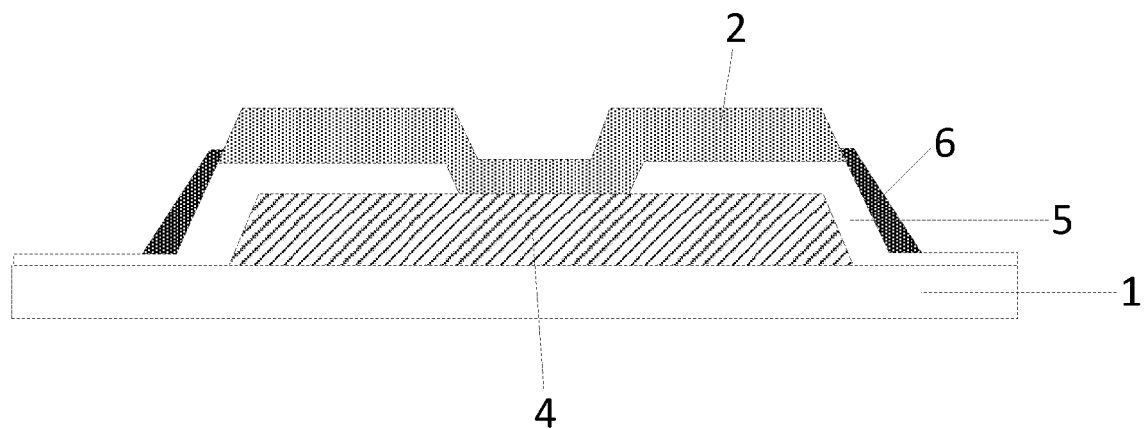
FIG. 5 is a schematic cross-sectional view of a structure taken along a direction DD' of FIG. 4.

As shown in FIG. 5, FIG. 5 is a schematic cross-sectional view of a structure taken along a direction DD' of FIG. 4. When the first touch electrodes 2 and the second touch electrodes 3 are formed, a small amount of residual metal 6 remains at an edge of each of the bridging electrodes 4, and the residual metal 6 is electrically connected to the corresponding first touch electrode 2 and the corresponding second touch electrode 3 on two opposite sides of the bridging electrode 4 circled by an oval dashed block E in FIG. 2 and FIG. 4, causing a short circuit between the first touch electrode 2 and the second touch electrode 3, and therefore causing a failure of the touch function.

Figure 6:
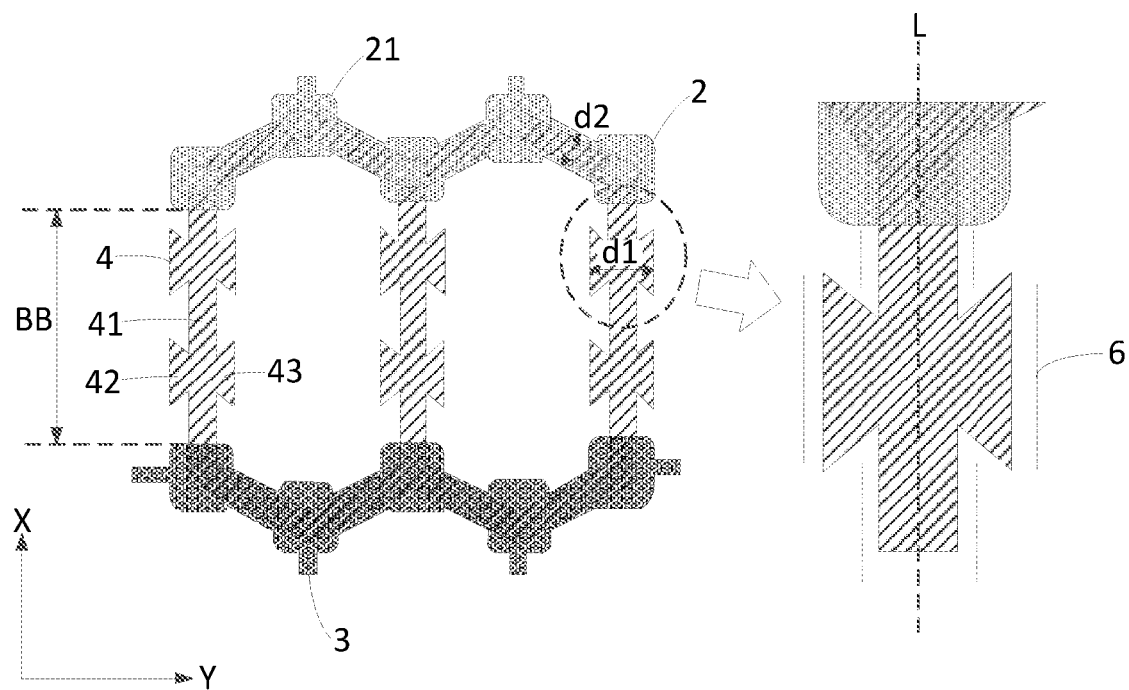
FIG. 6 is a schematic diagram of a structure of a touch substrate according to an embodiment of the present disclosure.
Figure 7:
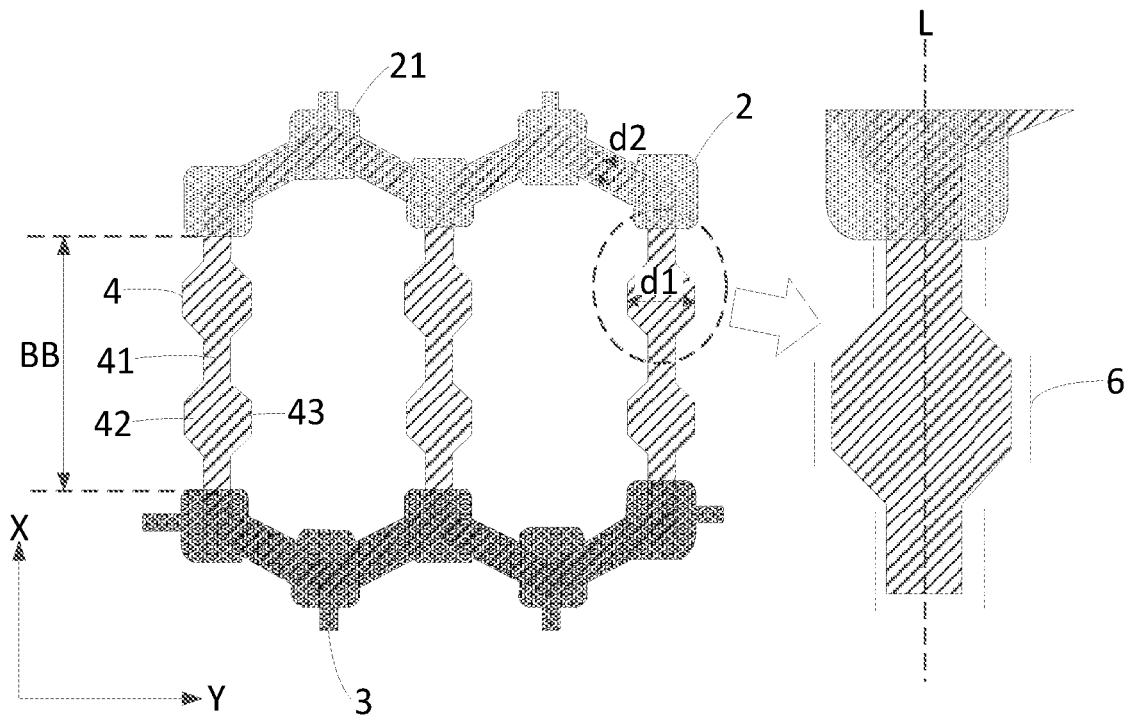
FIG. 7 is a schematic diagram of a structure of another touch substrate according to an embodiment of the present disclosure.
Figure 8:
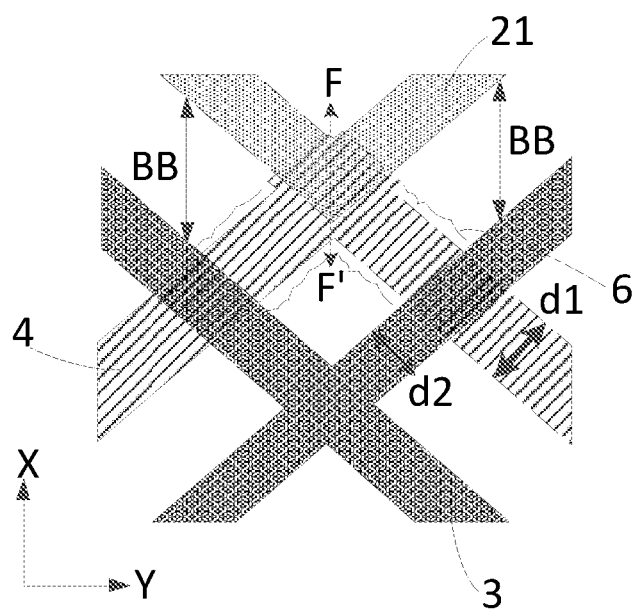
FIG. 8 is a schematic diagram of a part of a structure of FIG. 2.
Figure 9:
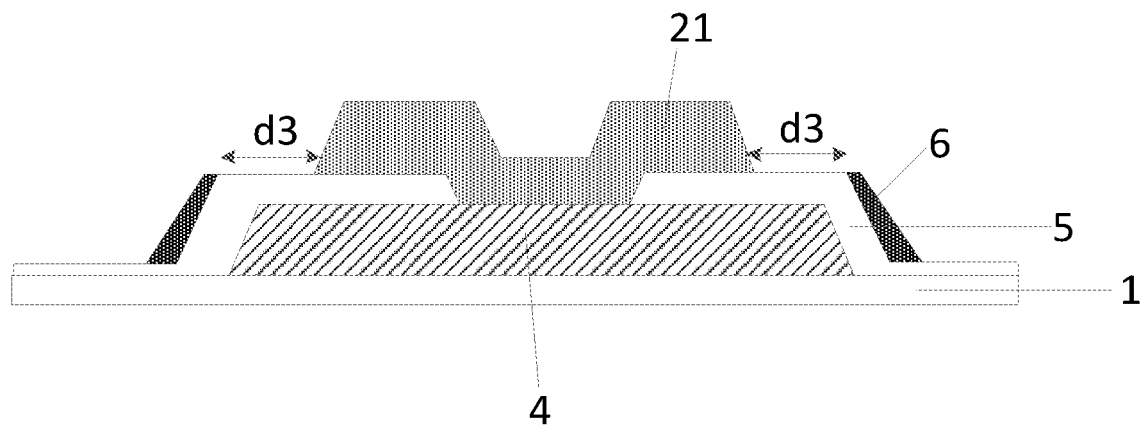
FIG. 9 is a schematic cross-sectional view taken along a direction FF' of FIG. 8.
Figure 10:
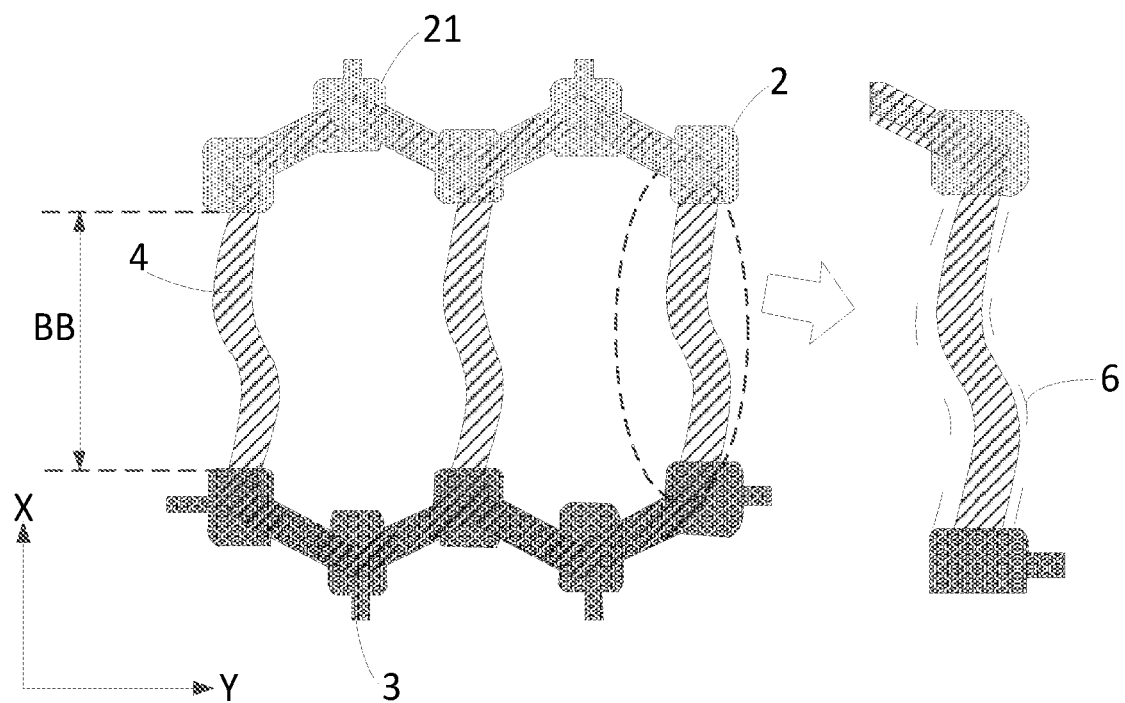
FIG. 10 is a schematic diagram of a structure of another touch substrate according to an embodiment of the present disclosure.

In order to solve the problem of failure of the touch function caused by the short circuit between the first touch electrode and the second touch electrode, an embodiment of the present disclosure provides a touch substrate, as shown in FIGS. 6 to 13. The left schematic diagram in each of FIGS. 6, 7 and 10 is an enlarged schematic diagram of an improved structure based on that shown in the dashed block B in FIG. 2, and the right schematic diagram in each of FIGS. 6, 7 and 10 is an enlarged schematic diagram of the improved structure in a dashed block of the corresponding left schematic diagram. FIGS. 8, 9 and 11 to 13 are schematic diagrams of improved structures based on those shown in FIGS. 4 and 5, respectively. The touch substrate includes: a base substrate 1, a first metal layer located on the base substrate, an insulating layer 5 located on a side of the first metal layer away from the base substrate, and a second metal layer located on a side of the insulating layer 5 away from the base substrate 1.

The first metal layer includes a plurality of bridging electrodes 4, the second metal layer includes a plurality of first touch electrodes 2 and a plurality of second touch electrodes 3 crossing each other and insulated from each other, each first touch electrode 2 includes at least two sub-electrodes 21, which are electrically connected together by at least one bridging electrode 4 through at least one via penetrating through an insulating layer 5.

The first touch electrodes 2 extend along a first direction X, the second touch electrodes 3 extend along a second direction Y, each sub-electrode 21 and its corresponding second touch electrode 3 have a spacing region BB therebetween in the first direction X, and a line width d1 of at least a part of the corresponding bridging electrode 4 in the spacing region BB is greater than a line width d2 of the second touch electrode 3.

According to the touch substrate provided by the embodiment of the present disclosure, the line width of at least a part of the bridging electrode in the spacing region between the sub-electrode of the corresponding first touch electrode and the corresponding second touch electrode in the first direction is greater than the line width of the second touch electrode. When the line width of only a part of the bridging electrode in the spacing region is greater than the line width of the second touch electrode, a routing length of an edge of the bridging electrode in the spacing region can be increased, so that the residual metal at the edge of the bridging electrode is discontinuous, and the short circuit between the sub-electrode of the first touch electrode and the second touch electrode can be avoided. When the line width of the whole bridging electrode is greater than the line width of the second touch electrode, an orthographic projection of the sub-electrode on the base substrate is located within an orthographic projection of the corresponding bridging electrode on the base substrate. That is, a flat insulating layer is arranged between an edge of the sub-electrode on the base substrate and an edge of the corresponding bridging electrode, the second metal layer may be completely etched on the flat insulating layer, so that a certain gap exists between the sub-electrode and the residual metal formed at the edge of the bridging electrode, the sub-electrode is insulated from the residual metal, the short circuit between the first touch electrode where the sub-electrode is located and the second touch electrode due to the metal residue can be avoided, and the touch effect of the touch substrate can be ensured.

In a specific implementation, in the above touch substrate provided in the embodiment of the present disclosure, as shown in FIGS. 6 and 7, each bridging electrode 4 in the spacing region BB includes a main body 41, and at least one first connection portion 42 and at least one second connection portion 43 electrically connected to two opposing sides of the main body 41. The designed structure of each bridging electrode 4 in the spacing region BB in FIG. 6 and FIG. 7 of the present disclosure increases the routing length of the edge of the bridging electrode 4, so that the residual metal 6 at the edge of the bridging electrode 4 is discontinuous, and the short circuit between the sub-electrode 21 of the first touch electrode 2 and the second touch electrode 3 can be avoided.

In a specific implementation, in the touch substrate provided in the embodiment of the present disclosure, as shown in FIGS. 6 and 7, the first connection portion 42 and the second connection portion 43 corresponding to each other are symmetrically disposed about a center line L of the main body 41 along the first direction X, so that the manufacturing process can be simplified. Alternatively, the first connection portion 42 and the second connection portion 43 corresponding to each other may be asymmetrically disposed with respect to the center line L of the main body 41 along the first direction X.

In s specific implementation, in the touch substrate provided in the embodiment of the present disclosure, as shown in FIGS. 6 and 7, a shape of each of the first connection portion 42 and the second connection portion 43 may be trapezoid. Alternatively, the shape of each of the first connection portion 42 and the second connection portion 43 may include, but not limited to, a triangle, or a quadrangle, or the like.

In a specific implementation, in the touch substrate provided in the embodiment of the present disclosure, as shown in FIGS. 6 and 7, when the shape of each of the first connection portion 42 and the second connection portion 43 is a trapezoid, any one of two bottom sides of the trapezoid is electrically connected to the main body 41, so that the routing length of the edge of the bridging electrode 4 can be increased. Specifically, as shown in FIG. 6, the shorter bottom side of the two bottom sides of the trapezoid is electrically connected to the main body 41. As shown in FIG. 7, the longer bottom side of the two bottom sides of the trapezoid is electrically connected to the main body 41.

In a specific implementation, in the touch substrate provided in the embodiment of the present disclosure, when the shape of each of the first connection portion 42 and the second connection portion 43 is a triangle, any side or vertex of the triangle is electrically connected to the main body 41 can increase the routing length of the edge of the bridging electrode 4.

In a specific implementation, in the touch substrate provided in the embodiment of the present disclosure, as shown in FIGS. 6 and 7, the main body 41, the at least one first connection portion 42, and the at least one second connection portion 43 of each bridging electrode 4 have a one-piece structure. Thus, the bridging electrode 4 may be manufactured by a single patterning process, and the cost is reduced.

In a specific implementation, FIG. 8 is a schematic diagram of a part of a structure of FIG. 2. FIG. 9 is a schematic cross-sectional view taken along a direction FF' of FIG. 8. As shown in FIG. 8 and FIG. 9, in the touch substrate provided in the embodiment of the present disclosure, the line width d1 of the bridging electrode 4 at each position in the spacing region BB is constant and is greater than the line width d2 of the corresponding second touch electrode 3. In this way, the orthographic projection of the sub-electrode 21 on the base substrate 1 is located within the orthographic projection of the corresponding bridging electrode 4 on the base substrate 1. That is, the flat insulating layer 5 is arranged between the edge of the sub-electrode 21 and the edge of the corresponding bridging electrode 4, and the second metal layer may be completely etched on the flat insulating layer 5, so that a certain gap d3 exists between the sub-electrode 21 and the residual metal 6 formed at the edge of the bridging electrode 4, the sub-electrode 21 is insulated from the residual metal 6, the short circuit between the first touch electrode 2 where the sub-electrode 21 is located and the second touch electrodes 3 due to the residual metal 6 can be avoided, and the touch effect of the touch substrate can be ensured.

In a specific implementation, in the touch substrate provided in the embodiment of the present disclosure, as shown in FIG. 1, FIG. 2, FIG. 8, and FIG. 9, the line widths d1 of all the bridging electrodes 4 are the same and each greater than the line width d2 of each second touch electrode 3. Therefore, not only the certain gap d3 exists between the sub-electrode 21 and the residual metal 6 formed at the edge of the bridging electrode 4, and the sub-electrode 21 is insulated from the residual metal 6, but also the process of forming the bridging electrodes 4 may be unified (performed through a single process).

In a specific implementation, in the touch substrate provided in the embodiment of the present disclosure, as shown in FIG. 10, a shape of the bridging electrode 4 at the spacing region BB may be a curve, so that the routing length at the edge of the bridging electrode 4 is increased, the residual metal 6 at the edge of the bridging electrode 4 is discontinuous, and the short circuit between the sub-electrode 21 of the first touch electrode 2 and the second touch electrode 3 can be avoided.

It should be noted that, FIG. 10 shows an embodiment of the present disclosure in which the shape of the bridging electrode 4 at the spacing region BB is further defined to be a curve on the basis that the line width d1 of the bridging electrode 4 is greater than the line width d2 of the second touch electrode 3 as shown in FIG. 8 and FIG. 9. Alternatively, the shape of the bridging electrode 4 at the spacing region BB is further defined to be a curve on the basis of FIG. 1 to FIG. 5 in the related art (in which the line width d1 of the bridging electrode 4 is less than the line width d2 of the second touch electrode 3).

In a specific implementation, in the touch substrate provided in the embodiment of the present disclosure, as shown in FIG. 1, FIG. 2, FIG. 8, and FIG. 9, a difference between the line width d1 of the bridging electrode 4 and the line width of the second touch electrode d2 may be greater than or equal to 0.4 µm.

Figure 11:
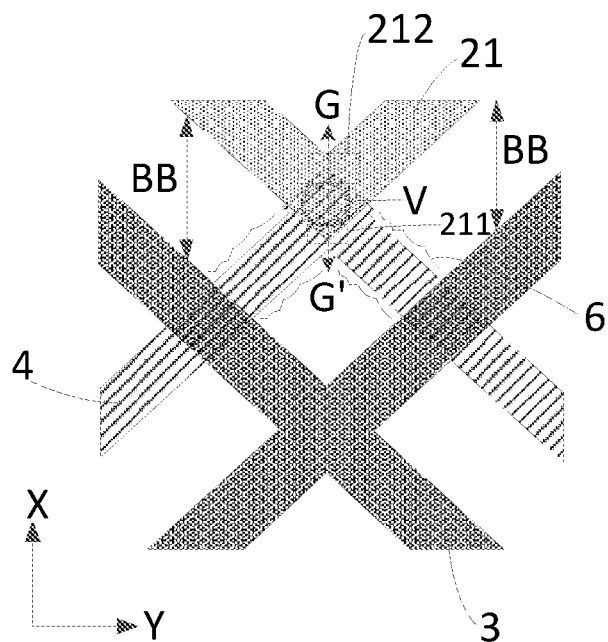
FIG. 11 is a schematic diagram of a part of a structure of FIG. 2.
Figure 12:
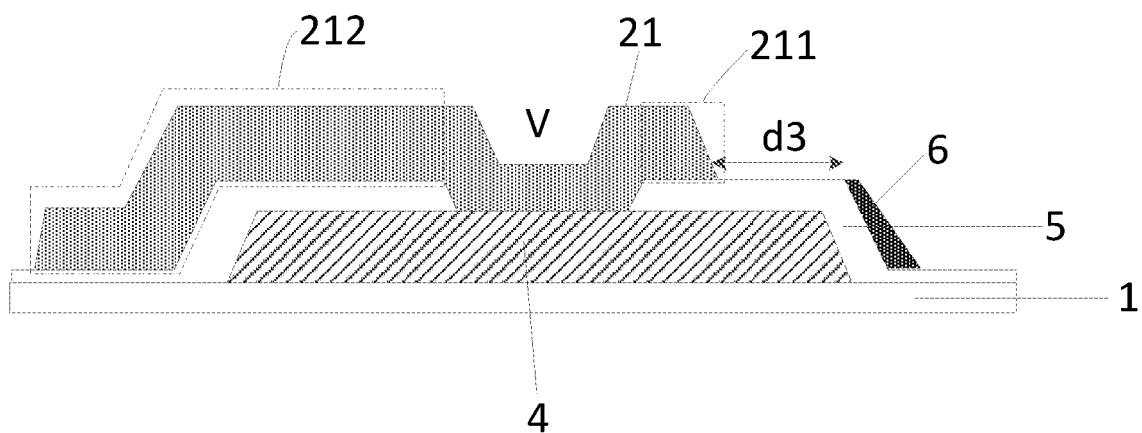
FIG. 12 is a schematic cross-sectional view taken along a direction GG' of FIG. 11.

In a specific implementation, FIG. 11 is a schematic diagram of a part of a structure of FIG. 2; and FIG. 12 is a schematic cross-sectional view taken along a direction GG' of FIG. 11. As shown in FIGS. 11 and 12, in the touch substrate provided in the embodiment of the present disclosure, the sub-electrode 21 includes a first portion 211 and a second portion 212 located on two opposing sides of a via V and arranged along the first direction X, the first portion 211 is closer to the corresponding second touch electrode 3, the second portion 212 is farther away from the corresponding second touch electrode 3, an orthographic projection of one end of the first portion 211 close to the second touch electrode 3 on the base substrate 1 is located in the orthographic projection of the corresponding bridging electrode 4 on the base substrate 1, and an orthographic projection of the second portion 212 on the base substrate 1 at least partially covers the orthographic projection of the corresponding bridging electrode 4 on the base substrate 1. In this way, the certain gap d3 exists between the first portion 211 of the sub-electrode 21 close to the second touch electrode 3 and the residual metal 6 formed at the edge of the bridging electrode 4, the sub-electrode 21 is insulated from the residual metal 6, the short circuit between the first touch electrode 2 where the sub-electrode 21 is located and the second touch electrode 3 due to the residual metal 6 can be avoided, and the touch effect of the touch substrate can be ensured.

Figure 13:
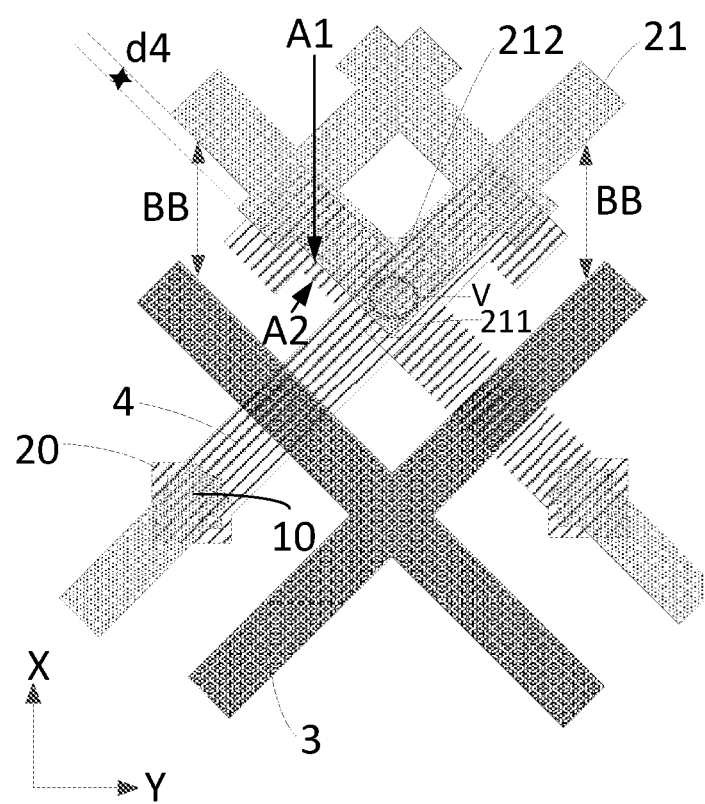
FIG. 13 is a schematic diagram of a structure of another touch substrate according to an embodiment of the present disclosure.

It should be noted that the structure in FIGS. 11 and 12 is designed on the basis of the line width d1 of the bridging electrode 4 being greater than the line width d2 of the second touch electrode 3 as shown in FIG. 8 and FIG. 9. Alternatively, the structure in FIGS. 11 and 12 is designed on the basis of the line width of the bridging electrode 4 being less than the line width of the second touch electrode 3 in the related art. As shown in FIG. 13, the line width d1 of the bridging electrode 4 is greater than the line width d2 of the second touch electrode 3, the orthographic projection of one end of the first portion 211 close to the corresponding second touch electrode 3 on the base substrate 1 is located in the orthographic projection of the corresponding bridging electrode 4 on the base substrate 1, and the orthographic projection of the second portion 212 on the base substrate 1 at least partially covers the orthographic projection of the corresponding bridging electrode 4 on the base substrate 1. Therefore, the gap d3 between the first portion 211 of the sub-electrode 21 close to the corresponding second touch electrode 3 and the residual metal 6 formed at the edge of the corresponding bridging electrode 4 is greater, so that it is further ensured that the sub-electrode 21 is insulated from the residual metal 6, the short circuit between the first touch electrode 2 where the sub-electrode 21 is located and the second touch electrode 3 due to the residual metal 6 can be avoided, and the touch effect of the touch substrate can be ensured.

In a specific implementation, in the touch substrate provided in the embodiment of the present disclosure, as shown in FIG. 13, the sub-electrode 21 and the bridging electrode 4 corresponding to each other have a first overlapping region therebetween, and a distance d4 between a side A1 of the first region close to the corresponding second touch electrode 3 and a side A2 of the bridging electrode 4 close to the same second touch electrode 3 is greater than or equal to 0.2 µm.

In a specific implementation, in the touch substrate provided in the embodiment of the present disclosure, the first touch electrodes and the second touch electrodes each may have a mesh structure, so that when the touch substrate is integrated with a display substrate, the transmittance can be improved.

In a specific implementation, as shown in FIG. 13, the touch substrate provided in the embodiment of the present disclosure further includes: a first pad 10 provided integrally with its corresponding sub-electrode 21, and a second pad 20 provided integrally with its corresponding bridging electrode 4. An orthographic projection of the first pad 10 on the base substrate 1 covers an orthographic projection of the corresponding via V on the base substrate 1, and an orthographic projection of the second pad 20 on the base substrate 1 covers an orthographic projection of the corresponding via V on the base substrate 1. The orthographic projection of the first pad 10 on the base substrate 1 is located in the orthographic projection of the corresponding second pad 20 on the base substrate 1. Therefore, the gap between the second pad 20 and the residual metal 6 formed at an edge of the corresponding first pad 10 is greater, so that it is further ensured that the sub-electrode 21 is insulated from the residual metal 6, the short circuit between the first touch electrode 2 where the sub-electrode 21 is located and the second touch electrode 3 due to the residual metal 6 can be avoided, and the touch effect of the touch substrate can be ensured.

In a specific implementation, in the touch substrate provided in the embodiment of the present disclosure, as shown in FIG. 13, the first pad 10 may have a saw-tooth shape, and the second pad 20 may have a square shape, which is not limited thereto.

It should be noted that, the first touch electrode may be a touch driving electrode, and the second touch electrode may be a touch sensing electrode. Alternatively, the first touch electrode may be a touch sensing electrode, and the second touch electrode may be a touch driving electrode.

Based on the same inventive concept, the embodiment of the present disclosure further provides a touch display panel, which includes a display substrate and the touch substrate in any one of the embodiments of the present disclosure, the touch substrate is located on a side of a light outgoing surface of the display substrate. The implementation of the touch display panel may refer to the above embodiments of the touch substrate, and repeated descriptions are omitted herein.

In a specific implementation, in the touch substrate provided in the embodiment of the present disclosure, the display substrate includes a plurality of sub-pixel units, the first touch electrodes and the second touch electrodes both have the mesh structure, mesh lines of the mesh structure are located at gaps among the sub-pixel units, and mesh holes of the mesh structure correspond to the sub-pixel units. That is, the mesh lines of the first touch electrodes and the second touch electrodes having the mesh structure are arranged around the gaps among the sub-pixel units, so that the touch substrate does not affect the display of the display substrate, and the transmittance of the display substrate is improved.

Based on the same inventive concept, the embodiment of the present disclosure further provides a display apparatus, which includes the touch display panel in any one of the embodiments of the present disclosure. The display apparatus may be: any product or component with a display function, such as a mobile phone, a tablet computer, a television, a display, a notebook computer, a digital photo frame, a navigator or the like. The implementation of the display apparatus may refer to the above embodiments of the touch display panel, and repeated descriptions are omitted herein.

According to the touch substrate, the touch display panel and the display apparatus provided by the embodiment of the present disclosure, the line width of at least a part of the bridging electrode in the spacing region between the sub-electrode of the corresponding first touch electrode and the corresponding second touch electrode in the first direction is greater than the line width of the second touch electrode. When the line width of only a part of the bridging electrode in the spacing region is greater than the line width of the second touch electrode, a routing length of an edge of the bridging electrode in the spacing region can be increased, so that the residual metal at the edge of the bridging electrode is discontinuous, and the short circuit between the sub-electrode of the first touch electrode and the second touch electrode can be avoided. When the line width of the whole bridging electrode in the spacing region is greater than the line width of the second touch electrode, an orthographic projection of the sub-electrode on the base substrate is located within an orthographic projection of the corresponding bridging electrode on the base substrate. That is, a flat insulating layer is arranged between an edge of the sub-electrode and an edge of the corresponding bridging electrode, the second metal layer may be completely etched on the flat insulating layer, so that a certain gap exists between the sub-electrode and the residual metal formed at the edge of the bridging electrode, the sub-electrode is insulated from the residual metal, the short circuit between the first touch electrode where the sub-electrode is located and the second touch electrode due to the metal residue can be avoided, and the touch effect of the touch substrate can be ensured.

It will be apparent to one of ordinary skill in the art that various changes and modifications may be made to the present disclosure without departing from the spirit and scope of the present disclosure. Thus, if the changes and modifications of the present disclosure fall within the scope of the claims and their equivalents of the present disclosure, the present disclosure is also intended to encompass such the changes and modifications.

What is claimed is:

1. A touch substrate, comprising:
   a base substrate;
   a first metal layer on the base substrate and comprising a plurality of bridging electrodes;
   an insulating layer on a side of the first metal layer away from the base substrate; and
   a second metal layer on a side of the insulating layer away from the base substrate and comprising a plurality of first touch electrodes and a plurality of second touch electrodes crossing each other and insulated from each other, wherein the plurality of first touch electrodes extend along a first direction, the plurality of second touch electrodes extend along a second direction, the first touch electrode comprises at least two sub-electrodes, and the sub-electrode and its corresponding second touch electrode have a spacing region therebetween in the first direction;
   wherein the bridging electrode electrically connects the at least two sub-electrodes of its corresponding first touch electrode through vias penetrating through the insulating layer, an orthographic projection of the spacing region on the base substrate does not overlap with an orthographic projection of the vias on the base substrate, and a line width of at least a part of the bridging electrode in the spacing region is greater than a line width of the second touch electrode;
   wherein the bridging electrode is the spacing region comprises a main body, and a first connection portion and a second connection portion electrically connected to two opposing sides of the main body;
   the first connection portion and the second connection portion are symmetrically arranged about a center line of the main body along the first direction;
   a shape of each of the first connection portion and the second connection portion is a triangle, a quadrangle, or a trapezoid; and
   the shape of each of the first connection portion and the second connection portion is a triangle, and any side or vertex of the triangle is electrically connected to the main body.

2. The touch substrate of claim 1, wherein the main body, the first connection portion, and the second connection portion of the bridging electrode have a one-piece structure.

3. The touch substrate of claim 1, wherein a line width of the bridging electrode in the spacing region is constant, and is greater than the line width of the second touch electrode.

4. The touch substrate of claim 3, wherein line widths of all the plurality of bridging electrodes are equal to each other, and each greater than the line width of the second touch electrode.

5. The touch substrate of claim 4, wherein a shape of the bridging electrode line spacer region is a curve.

6. The touch substrate of claim 4, wherein a difference between the line width of the bridging electrode and the line width of the second touch electrode is greater than or equal to 0.4 μm.

7. The touch substrate of claim 1, wherein the sub-electrode comprises a first portion and a second portion on two opposing sides of a via and arranged along the first direction, the first portion is closer to the corresponding second touch electrode, the second portion is farther away from the corresponding second touch electrode, an orthographic projection of one end of the first portion close to the second touch electrode on the base substrate is within an orthographic projection of the corresponding bridging electrode on the base substrate, and an orthographic projection of the second portion on the base substrate at least partially covers the orthographic projection of the corresponding bridging electrode on the base substrate.

8. The touch substrate of claim 7, wherein the sub-electrode and the bridging electrode corresponding to each other have a first overlapping region therebetween, and a distance between a side of the first overlapping region close to the corresponding second touch electrode and a side of the bridging electrode close to the same second corresponding touch electrode is greater than or equal to 0.2 μm.

9. The touch substrate of claim 7, wherein the plurality of first touch electrodes and the plurality of second touch electrodes each have a mesh structure.

10. A touch display panel, comprising a display substrate and the touch substrate of claim 1, wherein the touch substrate is on a side of a light outgoing surface of the display substrate.

11. The touch display panel of claim 10, wherein the display substrate comprises a plurality of sub-pixel units, the plurality of first touch electrodes and the plurality of second touch electrodes each have a mesh structure, mesh lines of the mesh structure are at gaps among the plurality of sub-pixel units, and mesh holes of the mesh structure correspond to the plurality of sub-pixel units.

12. A display apparatus, comprising the touch display panel of claim 10.

13. A touch substrate, comprising:
   a base substrate;
   a first metal layer on the base substrate and comprising a plurality of bridging electrodes;
   an insulating layer on a side of the first metal layer away from the base substrate; and
   a second metal layer on a side of the insulating layer away from the base substrate and comprising a plurality of first touch electrodes and a plurality of second touch electrodes crossing each other and insulated from each other, wherein the plurality of first touch electrodes extend along a first direction, the plurality of second touch electrodes extend along a second direction, the first touch electrode comprises at least two sub-electrodes, and the sub-electrode and its corresponding second touch electrode have a spacing region therebetween in the first direction;

wherein the bridging electrode electrically connects the at least two sub-electrodes of its corresponding first touch electrode through vias penetrating through the insulating layer, an orthographic projection of the spacing region on the base substrate does not overlap with an orthographic projection of the vias on the base substrate, and a line width of at least a part of the bridging electrode in the spacing region is greater than a line width of the second touch electrode;

wherein the bridging electrode in the spacing region comprises a main body and a first connection portion and a second connection portion electrically connected to two opposing sides of the main body, the first connection portion and the second connection portion are symmetrically arranged about a center line of the main body along the first direction;

a shape of each of the first connection portion and the second connection portion is triangle, a quadrangle, or a trapezoid, wherein the shape of each of the first connection portion and the second connection portion is a trapezoid, and any one of two bottom sides of the trapezoid is electrically connected to the main body.

14. The touch substrate of claim 13, wherein the main body, the first connection portion, and the second connection portion of the bridging electrode have a one-piece structure.

15. The touch substrate of claim 13, wherein the sub-electrode comprises a first portion and a second portion on two opposing sides of a via and arranged along the first direction, the first portion is closer to the corresponding second touch electrode, the second portion is farther away from the corresponding second touch electrode, an orthographic projection of one end of the first portion close to the second touch electrode on the base substrate is within an orthographic projection of the corresponding bridging electrode on the base substrate, and an orthographic projection of the second portion on the base substrate at least partially covers the orthographic projection of the corresponding bridging electrode on the base substrate.

16. The touch substrate of claim 15, wherein the sub-electrode and the bridging electrode corresponding to each other have a first overlapping region therebetween, and a distance between a side of the first overlapping region close to the corresponding second touch electrode and a side of the bridging electrode close to the same second corresponding touch electrode is greater than or equal to 0.2 μm.

17. The touch substrate of claim 15, wherein the plurality of first touch electrodes and the plurality of second touch electrodes each have a mesh structure.

18. The touch substrate of claim 13, further comprising: a first pad covering the corresponding via and provided integrally with the corresponding sub-electrode, and a second pad provided integrally with the corresponding bridging electrode; wherein an orthographic projection of the second pad on the base substrate covers an orthographic projection of the corresponding via on the base substrate, and the orthographic projection of the first pad on the base substrate is within the orthographic projection of the second pad on the base substrate.

19. The substrate of claim 18, wherein the first pad has a saw-tooth shape at a side facing the second touch electrode, and the second pad has a square shape.

20. A touch substrate, comprising:
a base substrate;
a first metal layer on the base substrate and comprising a plurality of bridging electrodes;
an insulating layer on a side of the first metal layer away from the base substrate; and
a second metal layer on a side of the insulating layer away from the base substrate and comprising a plurality of first touch electrodes and a plurality of second touch electrodes crossing each other and insulated from each other, wherein the plurality of first touch electrodes extend along a first direction, the plurality of second touch electrodes extend along a second direction, the first touch electrode comprises at least two sub-electrodes, and the sub-electrode and its corresponding second touch electrode have a spacing region therebetween in the first direction;

wherein the bridging electrode electrically connects the at least two sub-electrodes of its corresponding first touch electrode through vias penetrating through the insulating layer, an orthographic projection of the spacing region on the base substrate does not overlap with an orthographic projection of the vias on the base substrate, and a line width of at least a part of the bridging electrode in the spacing region is greater than a line width of the second touch electrode, wherein the touch substrate further comprises: a first pad covering the corresponding via and provided integrally with the corresponding sub-electrode, and a second pad provided integrally with the corresponding bridging electrode; wherein an orthographic projection of the second pad on the base substrate covers an orthographic projection of the corresponding via on the base substrate, and the orthographic projection of the first pad on the base substrate is within the orthographic projection of the second pad on the base substrate; and the first pad has a saw-tooth shape at a side facing the second touch electrode, and the second pad has a square shape.

* * * * *